United States Patent [19]

Fourquier et al.

[11] Patent Number: 4,933,213

[45] Date of Patent: Jun. 12, 1990

[54] CROSSLINKING PROCESS

[75] Inventors: Dominique Fourquier, La Croix; Jean Perronin, Senlis, both of France

[73] Assignee: Societe Chimique des Charbonnages S.A., Paris, France

[21] Appl. No.: 122,879

[22] Filed: Nov. 16, 1987

[30] Foreign Application Priority Data

Nov. 14, 1986 [FR] France .................. 86 15843

[51] Int. Cl.$^5$ .................. B05D 3/10; B05D 3/02; C08J 3/24
[52] U.S. Cl. .................. 427/302; 427/333; 427/340; 525/327.3
[58] Field of Search .................. 427/302, 333, 340; 525/327.3

[56] References Cited

U.S. PATENT DOCUMENTS

| | | | |
|---|---|---|---|
| 2,857,354 | 10/1958 | Fang | 526/273 |
| 3,058,947 | 10/1962 | Fryling et al. | 526/273 |
| 3,317,453 | 5/1967 | MacDonald | 524/379 |
| 3,523,032 | 8/1970 | Kujas | 427/302 |
| 3,563,953 | 2/1971 | Lehmann | 526/273 |
| 3,904,587 | 9/1975 | Tanaka | 526/273 |
| 3,932,367 | 1/1976 | Labana | 525/327.3 |
| 4,076,671 | 2/1978 | Bright | 427/137 |
| 4,092,373 | 5/1978 | Siwiec et al. | 525/207 |
| 4,116,625 | 9/1978 | Yamamoto | 526/273 |
| 4,268,542 | 5/1981 | Sakakibara | 427/410 |
| 4,559,398 | 7/1984 | Tesch et al. | 528/94 |

FOREIGN PATENT DOCUMENTS

| | | |
|---|---|---|
| 0008125 | 2/1980 | European Pat. Off. . |
| 0106635 | 4/1984 | European Pat. Off. . |
| 0108712 | 5/1984 | European Pat. Off. . |
| 0124482 | 11/1984 | European Pat. Off. . |
| 0129394 | 12/1984 | European Pat. Off. . |
| 2149409 | 8/1972 | France . |
| 2544723 | 4/1984 | France . |
| 130656 | 7/1985 | Japan . |
| 1429758 | 9/1974 | United Kingdom . |

*Primary Examiner*—John C. Bleutge
*Assistant Examiner*—David Buttner
*Attorney, Agent, or Firm*—Millen, White & Zelano

[57] ABSTRACT

The invention relates to a crosslinking process for self-crosslinking copolymers essentially based on (meth)acrylic monomers and is characterized in that, on or before the deposition of a layer containing at least one crosslinking catalyst, a second layer containing at least one self-crosslinking copolymer in suspension or in solution in an aqueous medium or in an organic solvent is applied, and in that these two layers are subjected to a heat treatment such that crosslinking of the layer containing the copolymer is initiated.

The invention is used in the production of molded, impregnated, coated and printed articles, adhesives, binders, finishes, paints and varnishes.

17 Claims, No Drawings

CROSSLINKING PROCESS

BACKGROUND OF THE INVENTION

The present invention relates to a crosslinking process especially in the field of (meth)acrylic resins.

The process according to the invention is used for the preparation of molded, impregnated, coated and printed articles, adhesives, binders, finishes, paints and varnishes.

In the latter applications, since the plastic materials are associated with metallic articles, especially in the case of automobile bodies, it is extremely desirable to have coating compositions available which crosslink at low temperatures and substantially at temperatures lower than the transition temperatures of these plastics.

Hitherto, all kinds of polymers and polycondensates in the form of solutions, dispersions or powders have been used in the field of thermosetting paints and coatings. By way of example, the alkyd resins, polyesters, acrylic resins, epoxide resins obtained, for example, by condensation of derivatives of bis-phenol or polyoxyalkylene glycol with epichlorohydrin, polyurethanes prepared from polyols and isocyanates, and polyamides and the like may be mentioned.

Amongst these, the epoxide resins and especially epoxides of aromatics are known to be very sensitive to the action of light and weathering. The resins utilizing isocyanates, which are admittedly very toxic, raise application problems in turn.

Amongst the others, there has been particular interest in acrylic resins in the form of a dispersion and more generally in solution in organic solvents. When applied at high temperatures (generally between 130° C. and 200° C. in the course of approximately 30 minutes), they make it possible to obtain coatings provided not only with good mechanical characteristics but likewise good properties with respect to durability and resistance to weathering, water, solvents and chemical agents in general.

Unfortunately, the coatings which are thus obtained and are crosslinked at low temperatures, for example at 90° C. for 30 minutes, are relatively sensitive to prolonged action of water and are not suitable for the applications mentioned above.

To mitigate this disadvantage, acrylic copolymers prepared from glycidyl acrylate or methacrylate have been claimed. These copolymers are crosslinked by mixing with "crosslinking agents" such as: the dicarboxylic or polycarboxylic acids mentioned in U.S. Pat. No. 2,857,354 or French Patent 2,149,409, the dicarboxylic acid anhydrides quoted in Belgian Patent 819,623, the phenol/formaldehyde resins, polyamide resins or urea/-formaldehyde resins indicated in U.S. Pat. No. 3,058,947 or the resins containing amine groups, amide groups, acid groups or thiol groups, as mentioned in European Patent 0,129,394. Generally, these crosslinkings are promoted by the presence of known catalysts in this mixture, such as tetraalkylammonium salts, imidazole derivatives, tertiary amines or carboxylic acid salts. These compositions, applied in thin layers to metallic substrates, lead, after heat treatment at a low temperature, to coatings, the water resistance of which is in fact relatively good. Unfortunately, since crosslinking is incomplete under these conditions, the solvent resistance in inadequate. Moreover, the compositions prepared with the aid of the above mixtures above all undergo changes in time and end up by setting fairly rapidly to a solid mass in the pot.

To improve the reactivity of these systems, copolymers of glycidyl acrylate or methacrylate have been provided, in which these monomers are copolymerized with functional monomers carrying hydroxyl, carboxyl, anhydride, amine or amide functional groups, in order to make them "self-crosslinking", that is to say crosslinkable in the absence of crosslinking agents.

In this case, since the crosslinking can then take place in the absence of the "crosslinking agents" indicated above, it is possible to prepare simplified coating compositions by mixing these copolymers with the known catalysts, and thus without crosslinking agents. These compositions lead to coatings which have good water and solvent resistance and in addition show good general properties. Unfortunately, the stability of the composition is limited to a few hours, after which it sets to a solid mass in the pot.

SUMMARY OF THE INVENTION

A process has now been found, which allows this self-crosslinking to be accomplished, without any problem of setting to a solid mass in the pot, and coatings of very high quality to be produced.

In particular, the invention relates to a cross-linking process for self-crosslinking copolymers essentially based on (meth)acrylic monomers, which is characterized in that, on or before the deposition of a layer containing at least one crosslinking catalyst, a second layer containing at least one self-crosslinking copolymer in suspension or in solution in an aqueous medium or in an organic solvent is applied, and in that these two layers are subjected to a heat treatment such that crosslinking of the layer containing the copolymer(s) is initiated. The temperature of this heat treatment is preferably between 30° and 110° C., and with particular preference between 60° and 90° C.

In the process according to the invention, it was surprising to find that, in spite of the low temperatures used and the heterogeneity of the system, the catalytic reaction starts at the interface and causes crosslinking of the copolymer layer in its entirety. The coatings thus obtained have excellent water and solvent resistance and, in addition, show good general properties.

It has also been found that the process according to the invention gives equally good results, whether the layer containing the catalyst is located above or below the layer containing the self-crosslinking copolymer.

The process according to the invention is applicable to a system comprising several layers (A) which contain one or more self-crosslinking copolymers, the copolymers in each of these layers (A) being identical or different. For this, it is sufficient to interpose, between each of these layers (A), one interlayer containing at least one crosslinking catalyst and then to subject the system thus obtained to a heat treatment at a temperature between 30° and 110° C., preferably between 60° and 90° C., such that crosslinking of the self-crosslinking copolymers is initiated.

Preferably, the layer previously deposited is dried before applying a new layer which, depending on the case, is a layer containing the crosslinking catalyst or the self-crosslinking copolymer.

The layers containing the self-crosslinking copolymer are in the form of a solution or dispersion of the said copolymer in a solvent medium or aqueous medium.

Preferably, the self-crosslinking copolymers to be used in the process according to the invention are obtained from:

5 to 40% by weight of one or more monomers having one ethylenic bond and at least one glycidyl group, 1 to 20% by weight of one or more monomers having one ethylenic bond and one or more functional groups such as hydroxyl, carboxyl, amine, mono- and di-substituted amine, amide, mono- and disubstituted amide, sulphonic, aldehyde or anhydride groups, and 94 to 40% by weight of one or more comonomers having at least one ethylenic double bond.

These copolymers have a weight average molecular mass of between 1,000 and 80,000, preferably between 10,000 and 50,000, measured by gel permeation chromatography.

These copolymers have a transition temperature of between 0° C. and 80° C., preferably between 20° C. and 50° C.

The solids content of these solutions or dispersions is between 30% and 80% by weight, preferably between 50 and 60%, and the viscosity is between 5 and 5,000 poises, preferably between 10 and 500 poises, expressed at 60% solids content.

The above copolymers are obtained by known processes in solution, emulsion, suspension or bulk. The copolymerization reaction can be initiated by anionic or cationic catalysts or by catalysts or radiation capable of producing free radicals. The copolymerization can be carried out in a continuous, discontinuous, incremental or programmed manner, at varying temperatures between, for example, 40° C. and 160° C., depending on the monomers and catalysts employed. Preferably, the free-radical route in a solvent medium was used in the present invention.

Under these conditions, peroxygenated compounds such as benzoyl peroxide, lauroyl peroxide, bis-(4-tert-.butylcyclohexyl) peroxydicarbonate, tertiarybutyl perdecanoate, tertiarybutyl perbenzoate, tertiarybutyl perpivalate, methyl ethyl ketone peroxide, tertiarybutyl hydroperoxide, tertiarybutyl peroxide, peracetic acid or amine oxides are used for initiating the copolymerization reaction. Azo compounds such as 2,2'-azo-bis-isobutyronitrile, 4,4'-azo-bis-(4-cyano-pentanoic acid), 2,2'-azo-bis-(2,4-dimethylvaleronitrile) or redox systems such as the lauroyl peroxide/acetylacetone or 2,3-butanedione pair, the tertiarylbutyl perpivalate/cobalt octoate pair and the benzoyl peroxide/dimethylparatoluidine pair are also used as initiators. The quantities of catalyst used can vary within wide limits, for example between 0.5 and 8% by weight relative to the monomers to be copolymerized, preferably between 2 and 5%.

For regulating the molecular weight of the copolymers according to the invention and the viscosity of their solution, transfer agents known to those skilled in the art can be used during their preparation, such as the alkylmercaptans such as tertiary dodecylmercaptan, N-dodecylmercaptan and thioglycollic acid, or such as carbon tetrachloride, carbon tetrabromide and triphenylmethane. The quantities to be used are a function of the molecular weight to be obtained and can reach up to 5% by weight relative to the monomers and preferably vary between 0.1 and 1%.

The solids content of the dispersions or solutions of copolymers, which constitute the layers to be used in the present invention, can vary within very wide limits, for example from 30 to 80%, preferably between 50 and 60%, but it is advantageous to have products of very high solids content available.

As examples of monoethylenic monomers having at least one glycidyl group, glycidyl acrylate, glycidyl methacrylate, glycidyl crotonate, diglycidyl maleate, diglycidyl fumarate, diglycidyl itaconate, allyl glycidyl ether, diglycidyl monoacryloyl isocyanurate and diglycidyl monoallyl isocyanurate may be mentioned.

Monoethylenic monomers having one or more functional groups are to be understood as certain monomers which have at least one group capable of reacting, if required, with another monomer, another compound or the substrate itself, in order to establish crosslinking. These reactive groups are well known and can, for example, be the groups OH, $NH_2$, NH-alkyl, N-dialkyl, $CONH_2$, CONH-alkyl, CON-dialkyl, COOH, CO-O-OC (anhydride), $SO_3H$ and CHO. As examples of such monomers, hydroxyalkyl acrylates and methacrylates, such as ethylene glycol monoacrylate, propylene glycol monomethacrylate and butanediol monoacrylate, allyloxyethanol, allyl alcohol, N-(hydroxymethyl)-acrylamide, allylamine, dimethylaminoethyl acrylate and methacrylate, diethylaminoethyl acrylate, dimethylaminopentyl acrylate, vinylpyridine, vinylimidazole, 1-vinyl-2-methylimidazole, vinylcarbazole, vinylcaprolactam, vinylpyrrolidone, acrylamide and methacrylamide, N-(isobutoxymethyl)-acrylamide, N-isopropylacrylamide, methylacrylamidoglycollate methyl ether, acrylic acid, methacrylic acid, senecioic acid, 4-penten-3-oic acid, itaconic acid, crolonic acid, allylglycollic acid, 10-undecenoic acid, maleic anhydride, citraconic anhydride, vinylsulphonic acid, styrene-parasulphonic acid and acrolein may be mentioned.

As monomers which can be used as comonomers with the above and have one or more ethylenic bonds, essentially acrylic or methacrylic esters can be used, such as methyl, ethyl, butyl, isobutyl, tertiarybutyl, hexyl, 2-ethylhexyl, lauryl, stearyl, cyclohexyl, benzyl, phenyl, norobornyl, methoxyethyl, ethyldiglycol, tert-.butylcyclohexyl, β-phenylethyl, tetrahydrofurfuryl, dihydrodicyclopentadienyl, dibromopropyl, 2-[2-N-methyl-N-(perfluorooctyl)-ethylsulphonyl]-aminoethyl, trifluoroethyl and 2-(perfluorohexyl)ethyl acrylates and methacrylates, as well as acrylonitrile, methacrylonitrile and the chloride of 2-trimethylammoniumethyl acrylate. Other monomers, such as vinyl derivatives, can also be used: vinyl acetate, vinyl propionate, vinyl isobutyrate, vinyl senecioate, vinyl laurate, vinyl octanoate, vinyl 2-ethylhexanoate, vinyl methyl ether, vinyl ethyl ether, vinyl isobutyl ether, vinyl octadecyl ether, vinyl chloride, vinylidene chloride and the vinyl esters of the acids known commercially under the name versatic acids. Halogenated or non-halogenated hydrocarbons such as ethylene, propylene, isobutylene, styrene, α-methyl styrene, vinyltoluene and α-cyanomethylstyrene may also be used. Finally, a small quantity of monomers containing several ethylenic functions can be used, such as allyl methacrylate, ethylene glycol dimethacrylate, butane-1,4-diol dimethacrylate, trimethylolpropane trimethacrylate, hexanediol diacrylate, pentaerythritol tetraacrylate, butadiene, chlorobutadiene, divinylbenzene and triallyl isocyanurate.

As mentioned above, the copolymerization is effected in solution, using one or more solvents in which the copolymer is soluble. Thus, solvents such as toluene, xylene, methyl ethyl ketone, ethylglycol acetate, isopropanol, butanol, trichloroethane, methylisobutylcarbinol, butyl acetate, methylglycol and ethylglycol, dibutyl ether, methylcyclohexane, 2-nitropropane, heptane, white spirit or cumene, individually or as a mixture, can be used.

The layer containing the crosslinking catalyst(s) may also contain one or more solvents and/or other copolymers, condensates, natural or synthetic resins or binders, or any other material unlikely to interfere with the migration of the catalyst to the adjacent layers which contain self-crosslinking copolymers.

These are, for example, vinyl copolymers or acrylic copolymers, alkyd resins, polyester resins, polyamides, cellulose derivatives such as cellulose acetates or cellulose acetobutyrates, carboxy cellulose or alkyl cellulose, nitrocellulose, or natural gums such as shellac and colophony derivatives.

The solvents to be used in the layer containing the crosslinking catalyst are, for example, the same as those used in the layer containing the self-crosslinking copolymer, or are different.

The quantities of crosslinking catalysts to be employed in the process according to the invention are preferably between 0.1 and 10% by weight relative to the quantity of the self-crosslinking copolymers.

Crosslinking catalysts suitable for the process according to the invention and promoting the crosslinking of the self-crosslinking copolymers at low temperature are generally tetraalkyl-phosphonium salts, imidazole derivatives, tertiary amines, boron derivatives or carboxylic acid salts. The following may be mentioned by way of example: tetrabutylphosphonium bromide, tetraphenylphosphonium bromide, 4-(hydroxymethyl)-imidazole chloride, imidazole or glyoxaline, 2-methylimidazole, 1-methyl-imidazole, 4-methylimidazole, 2,4-dimethylimidazole, 2-ethyl-4-methylimidazole, 2-undecylimidazole, 2-phenyl-4-methylimidazole, 1-benzyl-2-methylimidazole, 1-cyanoethyl-2-phenylimidazole trimellitate, 2,4-diamino-2-(2'-ethyl-4'-methylimidazol-1'-yl)-ethyl-s-triazine, 1-cyanoethyl-2-phenyl-4,5-di-(cyanoethoxymethyl)-imidazole, 2-[N-(benzylanilino)-methyl]-2-imidazoline phosphate, 2-benzyl-2-imidazoline hydrochloride, benzimidazole, mercaptobenzimidazole, 2-mercaptothiazoline, piperazine, N-methylmorpholine, N,N'-diethylcyclohexylamine, N,N-dimethylbenzylamine, dicyandiamide, triphenylphosphine, boron trifluoride, the $BF_3$/monoethylamine or monoethylamine, $BF_3$/2-methylimidazole and $BF_3$/phenol complexes, triethylenediamine, stannic chloride, aluminium chloride, triphenyltin chloride, dibutyl-tin dilaurate, uranyl nitrate, aluminium acetylacetonate and cobalt naphthenate. Products such as 1-vinylimidazole, 1-vinyl-2-methylimidazole and their polymers or copolymers can also be used. It is likewise possible to use blocked catalysts such as the 2-methylimidazole/pyromellitic acid or isocyanuric acid complexes, substituted ureas such as those described in European Patent 0,108,712, ketimines or aldimines such as N,N'-dicinnamylidene-1,6-hexanediamine, the products claimed in French Patent 2,544,723, hydrazides such as those mentioned in European Patent 106,635, imidazoles such as those mentioned in European Patent 0,124,482 or German Patent 3,327,823, or amine oxides.

The layers containing the self-crosslinking copolymer(s) or the crosslinking catalyst(s) can also contain various adjuvants such as colloids, thickeners, surfactants, dispersants, antioxidants, UV absorbers, stabilizers, corrosion inhibitors, grinding aids, siccatives, antiskinning agents, antistatic agents, anticratering agents, plasticizers, lubricants, antifoaming agents, water repellents, oil repellents, natural or synthetic waxes and fungicides.

These layers can also contain organic or inorganic fillers such as calcium carbonate, silica, glass particles, glass fibers or carbon fibers, talc, kaolin and alumina.

Finally, these layers can also contain inorganic or organic, soluble or dispersed pigments or colorants. By way of non-restrictive examples, titanium dioxide, lithopone, barium sulphate, calcium sulphate, basic lead silicate, zinc chromate, zinc oxide, iron oxides, lead chromate, ultramarine blue, green chromium oxide, molybdenum red and carbon black may be mentioned as inorganic pigments. Still by way of non-restrictive examples, colorants belonging to the most diverse classes such as azo compounds, azomethines, anthraquinones, phthalocyanines and indigoids may be mentioned as organic pigments. Pigment indanthrone (Colour Index No. 69,800), "CI Pigment Yellow 16" (No. 20,040), "CI Pigment Green 7" (No. 74,260), "CI Pigment Yellow 14" (No. 21,095), the disazo pigment obtained by coupling the tetrazo derivative of one mole of 4,4'-diamino-3,3'-dichloro-diphenyl with 2 moles of N-acetoacetyl-p-chloroaniline, chlorinated copper phthalocyanine green and copper α- and β-phthalocyanine blues may be mentioned as such pigments. Metal flakes such as aluminium flakes can be used for the same purpose.

As mentioned above, the coatings obtained by the process according to the invention are produced by means of at least two alternating layers, of which one contains at least one crosslinking catalyst and the other contains at least one self-crosslinking copolymer, these layers being applied separately one after the other in any order to a substrate with, if possible, drying between the two applications. Several layers can thus be deposited on a substrate in order to obtain "sandwich"-type coatings. In this case, the layers containing the self-crosslinking copolymer(s) are separated in each case by an interlayer containing the crosslinking catalyst(s). The coatings thus produced can have a thickness ranging from a few microns to several millimeters.

These coatings can be applied to diverse substrates such as metal, wood, glass and plastics. In particular, they can be applied to metallic substrates such as steel or aluminium, with or without an undercoat such as primers based on zinc phosphate or resins deposited by electrophoresis.

In the process according to the invention, the application of the layers containing the self-crosslinking copolymer(s) and/or the crosslinking catalyst(s) can be carried out by conventional techniques such as spraying, gun-spraying, coating, dipping, brushing, roller-coating, curtain-coating or pouring. After application and drying of these layers by the process according to the invention, they undergo a heat treatment for several minutes, generally 10 to 120 minutes, at the relatively low temperatures defined above.

The coatings prepared by the process according to the invention show good water and solvent resistance. In addition, they have good general properties.

The examples which now follow, given by way of illustration, will make it easier to understand the invention.

In these examples, the quantities of products are given in parts by weight and the percentages are given in % by weight.

Examples 1 to 6 relate to the preparation of self-crosslinking copolymers which are to be tested in accordance with the process of the invention in Examples 7 to 18.

EXAMPLE 1

A reactor fitted with a heating device, reflux condenser, stirrer, a thermometer, a nitrogen inlet and a funnel for introducing reactants is charged with 393 parts of ethylglycol acetate and heated to 78° C. under a nitrogen atmosphere.

A mixture of 123.7 parts of glycidyl methacrylate, 35.4 parts of methacrylic acid, 218.1 parts of butyl acrylate and 212.1 parts of methyl methacrylate is prepared separately, and 17.7 parts of bis-4-tert.butylcyclohexyl peroxydicarbonate are dissolved in the mixture while maintaining the latter at a temperature below 15° C.

The mixture of the monomers and of the catalyst is introduced in the course of two hours by means of the funnel into the reactor which is maintained at a temperature of 78±1° C.

After the addition of the monomers, the temperature of 78° C. is maintained for a supplementary period of 1 hour before final cooling.

The resin thus obtained shows a solids content of 59.2% (measured by baking 0.5 part of resin for one hour at 150° C.) corresponding to a copolymerization yield of 97.6%, a viscosity of 625 poises at 20° C., a weight average molecular mass of 48,000 and a glass transition temperature (designated Tg below) of 20° C.

EXAMPLE 2

A reactor fitted with a heating device, a reflux condenser, a stirrer, a thermometer, a nitrogen inlet and a funnel for introducing reactants is charged with 390.8 parts of methyl isobutyl ketone and heated to 78° C. under a nitrogen atmosphere.

A mixture of 129.9 parts of glycidyl methacrylate, 49.4 parts of methacrylic acid, 34.5 parts of hydroxyethyl methacrylate, 177.0 parts of butyl acrylate and 183.9 parts of methyl methacrylate is prepared separately, and 20.1 parts of bis-4-tertiarybutylhexyl peroxydicarbonate are dissolved in the mixture maintained at a temperature below 15° C.

The mixture of the monomers and of the catalyst is introduced in the course of 45 minutes by means of the funnel into the reactor, which is maintained at a temperature of 78±1° C. After addition of the monomers, the temperature of 78±1° C. is maintained for a complementary period of 45 minutes. During this period, a further addition of 2.9 parts of bis-4-tertiarybutylcyclohexyl peroxydicarbonate is made dropwise in the course of 15 minutes, 10 minutes after the end of the introduction of the reactants, in order to complete the copolymerization reaction of the monomers. The reaction mixture is then cooled.

The resin thus obtained has a solids content of 58.8% (measured by baking 0.5 part of resin for 1 hour at 150° C.) corresponding to a yield of 98.3%, a viscosity of 305 poises at 20° C., a weight average molecular mass of 64,000 and a Tg of 28° C.

EXAMPLE 3

A reactor fitted with a heating device, a reflux condenser, a stirrer, a thermometer, a nitrogen inlet and a funnel for introducing reactants is charged with 376.2 parts of methyl isobutyl ketone and heated to 78° C. under a nitrogen atmosphere. A mixture of 123.0 parts of glycidyl methacrylate, 35.1 parts of methacrylic acid, 216.8 parts of butyl acrylate and 210.9 parts of methyl methacrylate is prepared separately, and 20.5 parts of bis-4-tertiarybutylcyclohexyl peroxydicarbonate are dissolved in the mixture maintained at a temperature below 15° C.

The mixture of the monomers and of the catalyst is introduced in the course of 45 minutes by means of the funnel into the reactor maintained at a temperature of 78±1° C. After addition of the monomers, the temperature of 78° C. is maintained for a complementary period of 45 minutes. During this period, a further addition of 2.9 parts of bis-4-tertiarybutylcyclohexyl peroxydicarbonate dissolved in 14.6 parts of methyl isobutyl ketone is made dropwise within 15 minutes, 10 minutes after the end of the introduction of the reactants, in order to complete the copolymerization reaction of the monomers. The reaction mixture is then cooled.

The resin thus obtained has a solids content of 59.5% (measured by baking 0.5 part of resin for one hour at 150° C.) corresponding to a copolymerization yield of 98.2%, a viscosity of 67 poises at 20° C., a weight average molecular mass of 44,200 and a Tg of 17° C.

EXAMPLE 4

A reactor fitted with a heating device, a reflux condensor, a stirrer, a thermometer, a nitrogen inlet and two funnels for introducing reactants is charged with 293 parts of methyl isobutyl ketone and heated to 78° C. under a nitrogen atmosphere.

A mixture of 42.2 parts of acrylamide in solution in 94.6 parts of methyl ethyl ketone is prepared separately, introduced into the first funnel for introducing reactants and kept warm. A mixture of 136.8 parts of glycidyl methacrylate, 199.6 parts of butyl acrylate and 199.6 parts of methyl methacrylate is prepared and introduced into the second funnel, and 19.9 parts of bis-4-tertiarybutylcyclohexyl peroxydicarbonate are dissolved in the mixture maintained at a temperature below 15° C.

The two mixtures are then introduced simultaneously in the course of 45 minutes by means of the two funnels into the reactor which is maintained at a temperature of 80±2° C. After the addition of the monomers, the temperature of 80° C. is maintained for a complementary period of 45 minutes. During this period, a further addition of 2.9 parts of bis-4-tertiarybutylcyclohexyl peroxydicarbonate dissolved in 11.4 parts of methyl isobutyl ketone is made dropwise within 15 minutes, 10 minutes after the end of the introduction of the reactants, in order to complete the copolymerization reaction of the monomers. The reaction mixture is then cooled.

The resin thus obtained has a solids content of 59.3% (measured by baking 0.5 part of resin for 1 hour at 150° C.) corresponding to a copolymerization yield of 98.7%, a viscosity of 210 poises at 20° C., a weight average molecular mass of 16,800 and a Tg of 41° C.

EXAMPLE 5

A reactor fitted with a heating device, a reflux condenser, a stirrer, a thermometer, a nitrogen inlet and a funnel for introducing reactants is charged with 395.4 parts of ethylglycol acetate and heated to 80° C. under a nitrogen atmosphere.

A mixture of 82.6 parts of glycidyl methacrylate, 33.7 parts of methacrylic acid, 261.5 parts of butyl acrylate and 203.5 parts of methyl methacrylate is prepared separately, and 23.3 parts of bis-4-tertiarybutylcyclohexyl peroxydicarbonate are dissolved in the mixture maintained at a temperature below 15° C.

The mixture of the monomers and of the catalyst is introduced in the course of two hours by means of the funnel into the reactor, which is maintained at a temperature of 80±2° C. After the addition of the monomers, the temperature of 80° C. is maintained for a complementary period of 1 hour, before final cooling.

The resin thus obtained has a solids content of 58.9% (measured by baking 0.5 part of resin for one hour at 150° C.) corresponding to a copolymerization yield of 97.2%, a viscosity of 78 poises at 20° C., a weight average molecular mass of 34,600 and a Tg of 9° C.

EXAMPLE 6

A reactor fitted with a heating device, a reflux condenser, a stirrer, a thermometer, a nitrogen inlet and a funnel for introducing reactants is charged with 397.8 parts of xylene and heated to 76° C. under a nitrogen atmosphere.

A mixture of 78.9 parts of hydroxyethyl methacrylate, 78.9 parts of glycidyl methacrylate, 181.3 parts of methyl methacrylate and 245.6 parts of butyl acrylate is prepared separately, and 17.5 parts of bis-4-tertiarybutylcyclohexyl peroxydicarbonate are dissolved in the mixture maintained at a temperature below 15° C.

The mixture of the monomers and of the catalyst is introduced in the course of 2.5 hours by means of the funnel into the reactor, which is maintained at a temperature of 76±2° C. After the addition of the monomers, the temperature of 76° C. is maintained for a complementary period of 1 hour, before final cooling.

The resin thus obtained has a solids content of 58.0% (measured by baking 0.5 part of resin for 1 hour at 150° C.) corresponding to a copolymerization yield of 96.3%, a viscosity of 87 poises at 20° C., a weight average molecular mass of 64,000 and a Tg of 28° C.

EXAMPLE 7

In the first step, 600 milligrams of a 2% solution of 2-methyl imidazole in methanol is deposited by spraying on a phosphated metal plate, trade name PARCOBOND 1041 from PARKER, of 85×195 mm size. A homogeneous deposit of 12 milligrams of pure product is obtained by natural evaporation of the methanol at ambient temperature.

By means of a 150 μm ERICHSEN filmograph, a second layer prepared from the resin described in Example 1 and rediluted with ethylglycol acetate, in order to obtain a solids content of 40% and a viscosity of 10 poises at 20° C., is deposited in a second step. This composition has excellent storage stability: after storage for 3 months at ambient temperature, the viscosity is not more than twice the original one. 1.5 g of previously diluted resin, corresponding to 0.6 g of dry resin of 100% solids content, are then deposited; the 2-methylimidazole content thus corresponds to 2% of the content of acrylic copolymer from Example 1.

After ¼ hour of predrying at ambient temperature, the plate is placed in a ventilated oven at 90±1° C. for a period of 30 minutes and then left for 24 hours at ambient temperature.

The coating thus obtained by crosslinking has the following properties:

a thickness of 35μ a Persoz pendulum hardness of 260 seconds according to French standard NFT 30,016, more than 5 minutes resistance to soaking with xylene. This resistance is measured by the time, after which a piece of cotton wool thoroughly impregnated with xylene and held on the film allows a skin of film to be scraped off even superficially by means of a finger nail or a small stick of wood.

more than 1 minute reistance to soaking with acetone, measured by means of the identical method.

not even a slight change in the gloss and appearance of the film after 500 hours immersion of the sample prepared above in a bath of distilled water maintained at 40° C.±1° C., according to French standard NFT 30,054.

For comparison, the same resin (namely that prepared in Example 1) diluted to 40% solids content in ethyl glycol acetate was applied without a preceding catalyst deposition; the properties of the coating thus obtained under the same conditions are unsatisfactory:

a Persoz hardness of 230 seconds no resistance to soaking with xylene and acetone swelling of the film after 100 hours immersion.

Still for comparison, the same resin (namely that prepared in Example 1) diluted to 40% solids content in ethylglycol acetate was applied without a preceding catalyst deposition, but as a mixture of the latter with the resin, in a quantity equivalent to that which would have been deposited on the plate. After an identical heat treatment, the properties of the coating thus obtained are identical to those in the test carried out according to the present invention;

a Persoz hardness of 270 seconds, more than 6 minutes resistance to soaking with xylene, more than 1 minute resistance to soaking with acetone, no change in the gloss and appearance of the film after 500 hours immersion.

Unfortunately, the storage stability of the mixture prepared in this Example is limited to 48 hours at a temperature of 20° C., after which setting to a solid mass is observed. Consequently, marketing of this mixture in the form of a "one-pot" system is not feasible because of its insufficient stability at ambient temperature due to the fact that it contains the catalyst.

EXAMPLE 8

The procedure of Example 7 is repeated with the following modifications: the quantity of 2-methylimidazole deposited is increased from 12 to 30 milligrams, corresponding to a content of 5% (dry on dry), the resin described in Example 1 is replaced by that described in Example 2 and the curing temperature is reduced from 90° to 75° C., all further details being the same in other respects.

The coating thus obtained by crosslinking has the following properties: a Persoz hardness of 235 seconds, more than 8 minutes resistance to soaking with xylene, more than 30 seconds resistance to soaking with acetone, no change in the gloss or appearance of the film after 500 hours immersion in water at 40° C.

The comparison with a second composition obtained by admixing 30 milligrams of 2-methylimidazole to the copolymer described in Example 2 gives, after an identical heat treatment, properties of the crosslinked film which are similar to those of the present invention: a Persoz hardness of 260 seconds, more than 8 minutes resistance to soaking with xylene, more than 30 seconds resistance to soaking with acetone, with the appearance and gloss unchanged after 500 hours in a bath at 40° C.

By contrast, the storage stability of this second composition is limited to 1 day at 20° C.

EXAMPLE 9

The procedure of Example 7 is repeated with the following modifications: the quantity of 2-methylimidazole is increased from 12 to 30 milligrams, which corresponds to a content of 5% (dry on dry), the resin described in Example 1 is replaced by that described in Example 6 and the curing temperature is raised from 90° to 110° C., all further details being the same in other respects.

The storage stability of this composition exceeds 3 months and the coating thus obtained by crosslinking has the following properties: Persoz hardness 270 seconds, 4 minutes resistance to soaking with xylene, 15 seconds resistance to soaking with acetone, no change in the gloss or appearance of the film after 500 hours immersion in water at 40° C.

The same composition applied without a preceding catalyst deposition does not allow a coating of adequate Persoz hardness to be obtained. In addition, it is instantaneously soluble in xylene and in acetone, and it shows a rapid change in its surface appearance after 24 hours immersion in a water bath at 40° C.

EXAMPLE 10

The procedure of Example 7 is repeated, but replacing the resin described in Example 1 by that described in Example 4, all further details being the same in other respects.

The storage stability of this composition according to the present invention is particularly good, since the change in viscosity is only 4% according to the accelerated test which gives the ratio of the viscosity obtained after 7 days standing at 40° C. to the original viscosity.

The coating obtained by crosslinking has the following properties: a Persoz hardness of 270 seconds, 15 minutes resistance to soaking with xylene, 0.5 minute resistance to soaking with acetone, no change in the gloss or appearance of the film after the water bath resistance test at 40° C.

EXAMPLE 11

The procedure of Example 7 is repeated with the same composition, but increasing the quantity of deposited 2-methylimidazole from 12 to 18 milligrams, corresponding to an increase from 2 to 3% calculated dry on dry, and replacing the copolymer described in Example 1 by that described in Example 5, all further details being the same in other respects.

The characteristics of the composition thus crosslinked are a Persoz hardness of 205 seconds, 1.5 minutes resistance to soaking with xylene, 20 seconds resistance to soaking with acetone, and no visible change in the gloss and surface quality of the film after 500 hours immersion in water at 40° C.

EXAMPLE 12

The procedure of Example 7 is repeated with the same composition, with the following modifications: the deposit of 12 mg of 2-methylimidazole is replaced by a deposit of 30 milligrams of piperazine, corresponding to a content of 5% (dry on dry), and also replacing the copolymer described in Example 1 by that described in Example 3, all further details being the same in other respects.

The coating thus obtained by crosslinking this composition has the following properties: a Persoz hardness of 275 seconds, 6 minutes resistance to soaking with xylene, 30 seconds resistance to soaking with acetone, no apparent change in the gloss and surface quality of the film after 100 hours immersion in water at 40° C.

By contrast, a second composition obtained by mixing the above copolymer and the indicated quantity of piperazine gives only a limited storage stability of 12 hours.

EXAMPLE 13

The procedure of Example 12 is followed with the same composition, but replacing the piperazine by dimethylbenzylamine, all further details being the same in other respects.

The coating thus obtained by crosslinking this composition has the following properties: a Persoz hardness of 260 seconds, 3 minutes resistance to soaking with xylene, 30 seconds resistance to soaking with acetone, no apparent change in the gloss and surface quality of the film after 200 hours immersion in water at 40° C.

By contrast, a second composition obtained by mixing the above copolymer and the indicated quantity of dimethylbenzylamine gives only a limited storage stability of 24 hours.

EXAMPLE 14

The procedure of Example 7 is repeated with the same composition, but applying a heat treatment of 10 minutes at 110° C., all further details being the same in other respects.

The coating thus obtained by crosslinking this composition has the following properties: a Persoz hardness of 230 seconds, 3 minutes resistance to soaking with xylene, 30 seconds resistance to soaking with acetone, no visible change in the gloss and surface quality of the film after 500 hours immersion in a water bath at 40° C.

By contrast, if the same composition is applied without a preceding deposition of catalyst, only a coating can be obtained which has a Persoz hardness of only 165 seconds, is instantaneously soluble in xylene and in acetone and shows a change in surface appearance after 50 hours immersion in a bath at 40° C.

EXAMPLE 15

The procedure of Example 7 is repeated with the same composition, but carrying out the following modified additional test, all further details being the same in other respects: the deposition of 2-methylimidazole is carried out in the same quantity, but spraying onto the plate, that is to say underneath the copolymer, is replaced by spraying on top of the copolymer predried beforehand for 15 minutes at ambient temperature.

The coating thus obtained by crosslinking has the following properties: a Persoz hardness of 275 seconds, 3.5 minutes resistance to soaking with xylene, 45 seconds resistance to soaking with acetone, no change of the surface appearance and gloss after 500 hours immersion in a water bath at 40° C.

EXAMPLE 16

The procedure of Example 15 is repeated with the same composition, but carrying out the following modified additional test, all further details being the same in other respects: the quantity of 2-methylimidazole is doubled from 12 to 24 milligrams and a second application of the copolymer described in Example 1 is carried out, followed by another predrying for 15 minutes at ambient temperature, such that the 2-methylimidazole is between the copolymer layers, at an overall content of 2% (dry on dry) relative to the said copolymer.

The coating thus obtained by crosslinking has the following properties: a Persoz hardness of 160 seconds, a 20 minutes resistance to soaking with xylene, 30 seconds resistance to soaking with acetone, no change in the surface appearance and gloss after 500 hours immersion in a water bath at 40° C.

EXAMPLE 17

The procedure of Example 7 is repeated with the same composition, but carrying out the following modification: a succession of 8 layers in total is deposited and predried, alternating a layer of the quantity of 2-methylimidazole and a layer of the copolymer as in Example 1.

All further details being the same in other respects, a crosslinked coating is obtained which has the following properties: a Persoz hardness of 120 seconds, 12 minutes resistance to soaking with xylene, 30 seconds resistance to soaking with acetone, no change in the surface appearance or gloss after 500 hours immersion in a water bath at 40° C.

EXAMPLE 18

The procedure of Example 16 is repeated with the same composition, but carrying out the following modification: the deposition by spraying of the indicated quantity of 20% 2-methylimidazole solution in methanol is replaced by deposition, by means of the Erichsen 150 μm filmograph, of a solution prepared from 3 g of cellulose acetobutyrate, 20 g of toluene and 3 g of a 20% solution of 2-methylimidazole in methanol. Each of the two deposits corresponds to an identical quantity of pure 2-methylimidazole.

All further details being the same in other respects, the coating thus obtained by crosslinking has the following properties: a Persoz hardness of 40 seconds, 4 minutes resistance to soaking with xylene, 3 minutes resistance to soaking with acetone, no change in surface appearance and gloss after 500 hours immersion in a water bath at 40° C.

We claim:

1. A crosslinking process for self-crosslinking copolymers obtained from 5 to 40% by weight of one or more monomers having one ethylenic bond and at least one glycidyl group, 1 to 20% by weight of one or more monomers having one ethylenic bond and one or more functional groups of hydroxyl, carboxyl, amine, mono- or disubstituted amine, amide, aldehyde, or anhydride groups, and 40 to 90% by weight of one or more comonomers having at least one ethylenic double bond, said copolymer having a weight average molecular mass of between 1000 and 80,000, comprising before or after deposition on a substrate selected from the group of glass or metal of a separate layer containing at least one crosslinking catalyst, applying a different layer containing at least one self-crosslinking copolymer in suspension or solution in an aqueous medium or in an organic solvent and subjecting these two layers to a heat treatment such that crosslinking of the layer containing the copolymer(s) is initiated.

2. A process according to claim 1, wherein the temperature of the heat treatment is between 30° and 110° C.

3. A process according to claim 2, wherein the temperature of the heat treatment is between 60° and 90° C.

4. A process according to claim 1, characterized in that the copolymer has a weight average molecular mass of between 10,000 and 50,000.

5. A process according to claim 1, comprising several layers (A) which contain one or more self-crosslinking copolymers, the said self-crosslinking copolymers being identical or different, and, interposed between the layers (A), an interlayer containing at least one crosslinking catalyst.

6. A process according to claim 1, wherein the monomer having one ethylenic bond and at least one glycidyl group is glycidyl acrylate, glycidyl methacrylate, glycidyl crotonate, diglycidyl maleate, diglycidyl fumarate, diglycidyl itaconate, allyl glycidyl ether, diglycidyl monoacryloyl isocyanurate or diglycidyl monoallyl isocyanurate.

7. A process according to claim 1, wherein the monomer having one ethylenic bond and one or more functional groups is a hydroxyalkyl acrylate, or hydroxyalkyl methacrylate.

8. A process according to claim 7, wherein the monomer having one ethylenic bond and one or more functional groups is ethylene glycol monoacrylate, propylene glycol monomethacrylate, butanediol monoacrylate, allyloxyethanol, allyl alcohol, N-(hydroxymethyl)-acrylamide, allylamine, dimethylaminoethyl acrylate, dimethylaminoethyl, methacrylate, diethylaminoethyl acrylate, dimethylaminopentyl acrylate, vinylpyridine, vinylimidazole, 1-vinyl-2-methylimidazole, vinylcarbazole, vinylcaprolactam, vinylpyrrolidone, acrylamide, methacrylamide, N-(isobutoxymethyl)-acrylamide, N-isopropylacrylamide, methacrylamidoglycollate methyl ether, acrylic acid, methacryic acid, senecioic acid, 4-penten-3-oic acid, itaconic acid, crotonic acid, allylglycollic acid, 10-undecenoic acid, maleic anhydride, citraconic anhydride, vinylsulphonic acid, styrene-parasulphonic acid or acrolein.

9. A process according to claim 1, wherein the comonomer with at least one ethylenic bond is methyl, ethyl, butyl, isobutyl, tertiarybutyl, hexyl, 2-ethylhexyl, lauryl, stearyl, cyclohexyl, benzyl, phenyl, norbornyl, methoxyethyl, ethyldiglycol, tert.butylcyclohexyl, beta-phenylethyl, tetrahydrofurfuryl, dihydrodicyclopentadienyl, dibromopropyl, 2-[2-N-methyl-N-(perfluorooctyl)-ethylsulphonyl]-aminoethyl, trifluoroethyl and 2-(perfluorohexyl)-ethyl acrylate or methacrylate, acrylonitrile, methacrylonitrile, 2-trimethylammonium-ethyl acryl-chloride, vinyl acetate, vinyl propionate, vinyl isobutyrate, vinyl senecioate, vinyl laurate, vinyl octanoate, vinyl 2-ethylhexanoate, vinyl methyl ether, vinyl ethyl ether, vinyl isobutyl ether, vinyl octadecyl ether, vinyl chloride, vinylidene chloride, ethylene, propylene, isobutylene, styrene, alpha-methyl styrene, vinyltoluene and alpha-cyanomethylstyrene, allyl methacrylate, ethylene glycol dimethacrylate, butane-1,4-diol dimethacrylate, trimethylolpropane trimethacrylate, hexanediol diacrylate, pentaerythritol tetraacrylate, butadiene, chlorobutadiene, divinylbenzene or triallyl isocyanurate.

10. A process according to claim 1, wherein the cross-linking catalyst is a tetraalkyl-phosphonium salt, an imidazole derivative, a tertiary amine, an organic boron derivative or a carboxylic acid salt.

11. A process according to claim 1, wherein the cross-linking catalyst is tetrabutylphosphonium bromide, tetraphenylphosphonium bromide; 4-(hydroxymethyl)-imidazole chloride, imidazole or glyoxaline; 2-methyl-imidazole; 1-methyl-imidazole; 4-methylimidazole; 2,14-dimethyl imidazole; 2-ethyl-4-methylimidazole; 2-undecylimidazole; 2-phenyl-4-methylimidazole; 1-benzyl-2-methylimidazole; 1-cyanoethyl-2-phenylimidazole trimellitate; 2,4-diamino-2-(2'-ethyl-4'-methylimidazol-1'-yl)-ethyl-s-triazine; 1-cyanoethyl-2-phenyl-4,5-di-(cyanoethoxymethyl)-imidazole; 2-N-(benzylanilino)-methyl]-2-imidazoline phosphate; 2-benzyl-2-imidazoline hydrochloride; benzimidazole; mercaptobenzimidazole; 2-mercaptothiazoline; piperazine; N-methylmorpholine; N,N-diethylcyclchexylamine; N,N-dimethylbenzylamine; dicyandiamide; triphenylphosphine; boron trifluoride; $BF_3$/monomethylamine or monoethylamine; a $BF_3$/2-methylimidazole or $BF_3$/phenol complex; triethylenediamine; triphenyl-tin chloride; dibutyl-tin dilaurate; uranyl nitrate; aluminium acetylacetonate; cobalt naphthenate; 1-vinylimidazole, 1-vinyl-2-methylimidazole or polymers or copolymers thereof; a 2-methylimidazole/pyromelitic acid or isocyanuric acid complex; or N,N'-dicinnamylidene-1,6-hexanediamine.

12. A process according to claim 1, wherein the layer of self-crosslinking copolymer is applied before the layer containing at least one crosslinking catalyst.

13. A process according to claim 1, wherein the layer of self-crosslinking copolymerr is applied after the layer containing at least one crosslinking catalyst.

14. A process according to claim 1, wherein each self-crosslinking copolymer and crosslinking catalyst layer is dried before application of a subsequent layer, and catalysis of the crosslinking reaction occurs initially at least one catalyst-copolymer interface and causes crosslinking of the copolymer layer in its entirety.

15. A process according to claim 1, wherein the substrate is a metal.

16. A process according to claim 1, wherein the substrate is steel or aluminum.

17. A process according to claim 1, wherein the catalyst is a tertiary amine.

* * * * *